(12) United States Patent
Miller et al.

(10) Patent No.: US 11,299,997 B2
(45) Date of Patent: Apr. 12, 2022

(54) RADIAL SEAL ARRANGEMENT WITH AXIALLY ELONGATED OIL COOLED RUNNER

(71) Applicant: UNITED TECHNOLOGIES CORPORATION, Farmington, CT (US)

(72) Inventors: Jonathan Logan Miller, Ware, MA (US); M Rifat Ullah, South Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 313 days.

(21) Appl. No.: 16/546,436

(22) Filed: Aug. 21, 2019

(65) Prior Publication Data

US 2021/0054755 A1 Feb. 25, 2021

(51) Int. Cl.
*F01D 11/00* (2006.01)
*F02C 7/28* (2006.01)
*F01D 25/16* (2006.01)
*F01D 25/18* (2006.01)
(Continued)

(52) U.S. Cl.
CPC ............. *F01D 11/003* (2013.01); *F02C 7/28* (2013.01); *F01D 25/162* (2013.01); *F01D 25/183* (2013.01); *F02C 7/06* (2013.01); *F05D 2220/323* (2013.01); *F05D 2230/60* (2013.01); *F05D 2240/50* (2013.01); *F05D 2240/55* (2013.01); *F05D 2240/60* (2013.01); *F05D 2260/20* (2013.01); *F05D 2300/224* (2013.01); *F16J 15/441* (2013.01)

(58) Field of Classification Search
CPC .... F01D 11/003; F01D 25/162; F01D 25/183; F02C 7/28; F02C 7/06
See application file for complete search history.

(56) References Cited

U.S. PATENT DOCUMENTS

| | | |
|---|---|---|
| 2,956,824 A | 10/1960 | Kuchler et al. |
| 5,558,341 A | 9/1996 | McNickle et al. |
| 5,813,830 A | 9/1998 | Smith et al. |

(Continued)

FOREIGN PATENT DOCUMENTS

EP 2986832 A1 2/2016

OTHER PUBLICATIONS

European Search Report for European Patent Application No. 20177456.9 dated Nov. 24, 2020.

*Primary Examiner* — Michael L Sehn
(74) *Attorney, Agent, or Firm* — Carlson, Gaskey & Olds, P.C.

(57) ABSTRACT

A seal includes a seal runner, at least one seal ring, and a seal housing. The runner extends in an axial direction to a runner end face that faces a bearing. The ring is fixed to a static structure and has an inner surface engaging the seal runner and a first face that faces the bearing. The seal housing is fixed to the static structure and includes a first portion extending in an axial direction from the first face of the seal ring to a housing face that faces the bearing. The first portion has a first length extending from the first face of the seal ring to the housing face. The seal runner has a first runner portion with a second length that extends from the first face of the seal ring to the runner end face. The second length is at least 35% longer than the first length.

20 Claims, 6 Drawing Sheets

(51) Int. Cl.
*F02C 7/06* (2006.01)
*F16J 15/44* (2006.01)

(56) References Cited

U.S. PATENT DOCUMENTS

| | | | |
|---|---|---|---|
| 8,905,408 B2* | 12/2014 | Garrison | F02C 7/28 |
| | | | 277/418 |
| 9,631,508 B2* | 4/2017 | Blais | F01D 11/003 |
| 2006/0251512 A1 | 11/2006 | Singh et al. | |
| 2011/0068541 A1 | 3/2011 | Durling | |
| 2015/0069712 A1 | 3/2015 | Garrison | |
| 2016/0169019 A1 | 6/2016 | Huppe et al. | |
| 2016/0348791 A1 | 12/2016 | Labbe | |
| 2016/0348792 A1* | 12/2016 | Labbe | F01D 25/183 |
| 2017/0016350 A1* | 1/2017 | Miller | F01D 25/183 |

\* cited by examiner

RADIAL SEAL ARRANGEMENT WITH AXIALLY ELONGATED OIL COOLED RUNNER

BACKGROUND

This application relates to a gas turbine engine that includes a component comprising a seal with an elongated oil cooled runner.

Gas turbine engines are known and typically include a fan delivering air into a bypass duct as bypass air and into a compressor as core air. The air is compressed and delivered into a combustor section where the air is mixed with fuel and ignited. Products of the combustion pass downstream over turbine rotors, which causes the turbine rotors to rotate.

In one known type of gas turbine engine, there are at least two turbine rotors, each driving a compressor rotor. These turbine rotors are supported by a series of bearings. Advanced engine applications have a higher rubbing velocity for bearings and can require a small radial clearance seal. It is a challenge to control and maintain acceptable levels of oil containment in the bearing compartment for such seals. Traditionally, these seal configurations maintain a close proximity of the runner cooling oil to the static seal housing assembly, which can result in increased bearing compartment oil loss and reduced oil containment.

SUMMARY

In a featured embodiment, a gas turbine engine component includes at least one bearing to support a shaft for rotation about an engine axis, wherein the at least one bearing is positioned within a bearing compartment, and a seal assembly to provide sealing for the bearing compartment. The seal assembly includes a seal runner that rotates about the engine axis and extends in an axial direction to a runner end face that faces the at least one bearing. At least one seal ring is fixed to an engine static structure and has a radially inner surface engaging the seal runner and a first end face that faces the at least one bearing. A seal housing is fixed to the engine static structure and includes a first housing portion extending in an axial direction from the first end face of the at least one seal ring to a housing end face that faces the at least one bearing. The first housing portion has a first axial length extending from the first end face of the at least one seal ring to the housing end face, and the seal runner has a first runner portion that has a second axial length that extends from the first end face of the at least one seal ring to the runner end face. The second axial length is at least 35% longer than the first axial length.

In another embodiment according to the previous embodiment, the second axial length is at least 50% longer than the first axial length.

In another embodiment according to any of the previous embodiments, the first runner portion includes a radially outer surface with a plurality of chopper slots spaced circumferentially apart from each other.

In another embodiment according to any of the previous embodiments, the first housing portion includes a radially inner surface with a plurality of protrusions that face the plurality of chopper slots.

In another embodiment according to any of the previous embodiments, the first runner portion includes a retention lip that extends in a radially inward direction at the runner end face.

In another embodiment according to any of the previous embodiments, the first runner portion includes a plurality of exit holes extending through the first runner portion from a radially inner surface to a radially outer surface, and wherein the plurality of exit holes are axially spaced apart from the retention lip.

In another embodiment according to any of the previous embodiments, the plurality of exit holes comprises a single row of holes that are circumferentially spaced apart from each other about the engine axis.

In another embodiment according to any of the previous embodiments, the retention lip includes a plurality of scallops formed within a radially inner surface of the first runner portion.

In another embodiment according to any of the previous embodiments, the at least one bearing includes an inner race fixed for rotation with the shaft and an outer race fixed to the engine static structure, and wherein the runner end face is surrounded by at least one of the inner race and outer race in a radially overlapping relationship.

In another embodiment according to any of the previous embodiments, the at least one seal ring comprises at least two seal rings with a first seal ring that has the first end face that faces the at least one bearing and that has a second end face that faces a second seal ring, and wherein the seal housing includes a second housing portion that abuts against the second seal ring such that the first and second housing portions cooperate to enclose the first and second seal rings in a cavity formed between the seal housing and the seal runner.

In another embodiment according to any of the previous embodiments, the seal runner includes a second runner portion that extends from the first end face of the first seal ring to a distal end that extends in a radially inward direction toward the shaft, and wherein the first runner portion is radially spaced apart from the shaft and the distal end engages the shaft.

In another featured embodiment, a gas turbine engine component includes at least one bearing to support a shaft for rotation about an engine axis, wherein the at least one bearing is positioned within a bearing compartment, and a seal assembly to provide sealing for the bearing compartment. The seal assembly includes a seal runner that rotates about the engine axis and extends in an axial direction to a runner end face that faces the at least one bearing. At least one seal ring is fixed to an engine static structure and has a radially inner surface engaging the seal runner and a first end face that faces the at least one bearing. A seal housing is fixed to the engine static structure and includes a first housing portion extending in an axial direction from the first end face of the at least one seal ring to a housing end face that faces the at least one bearing. The seal housing includes a second housing portion that receives the at least one seal ring. The first housing portion has a first axial length extending from the first end face of the at least one seal ring to the housing end face. The seal runner has a first runner portion that has a second axial length that extends from the first end face of the at least one seal ring to the runner end face. The second axial length is longer than the first axial length. The first runner portion includes a retention lip that extends in a radially inward direction at the runner end face, and the first runner portion includes a plurality of holes and/or a plurality of scallops.

In another embodiment according to any of the previous embodiments, the plurality of holes comprises a plurality of exit holes extending through the first runner portion from a radially inner surface to a radially outer surface, and wherein the plurality of exit holes are axially spaced apart from the retention lip.

In another embodiment according to any of the previous embodiments, the plurality of exit holes comprises a single row of holes that are circumferentially spaced apart from each other about the engine axis.

In another embodiment according to any of the previous embodiments, the plurality of scallops formed within a radially inner surface of the first runner portion.

In another embodiment according to any of the previous embodiments, the second axial length is at least 35% longer than the first axial length.

In another embodiment according to any of the previous embodiments, the second axial length is at least 50% longer than the first axial length.

In another embodiment according to any of the previous embodiments, the first runner portion includes a radially outer surface with a plurality of chopper slots spaced circumferentially apart from each other.

In another embodiment according to any of the previous embodiments, the first housing portion includes a radially inner surface with a plurality of protrusions that face the plurality of chopper slots.

In another embodiment according to any of the previous embodiments, the at least one seal ring comprises at least two seal rings with a first seal ring that has the first end face that faces the at least one bearing and that has a second end face that faces a second seal ring, and wherein the second housing portion abuts against the second seal ring such that the first and second housing portions cooperate to enclose the first and second seal rings in a cavity formed between the seal housing and the seal runner, and wherein the seal runner includes a second runner portion that extends from the first end face of the first seal ring to a distal end that extends in a radially inward direction toward the shaft, and wherein the first runner portion is radially spaced apart from the shaft and the distal end engages the shaft.

These and other features may be best understood from the following drawings and specification.

DETAILED DESCRIPTION

Figure 1:
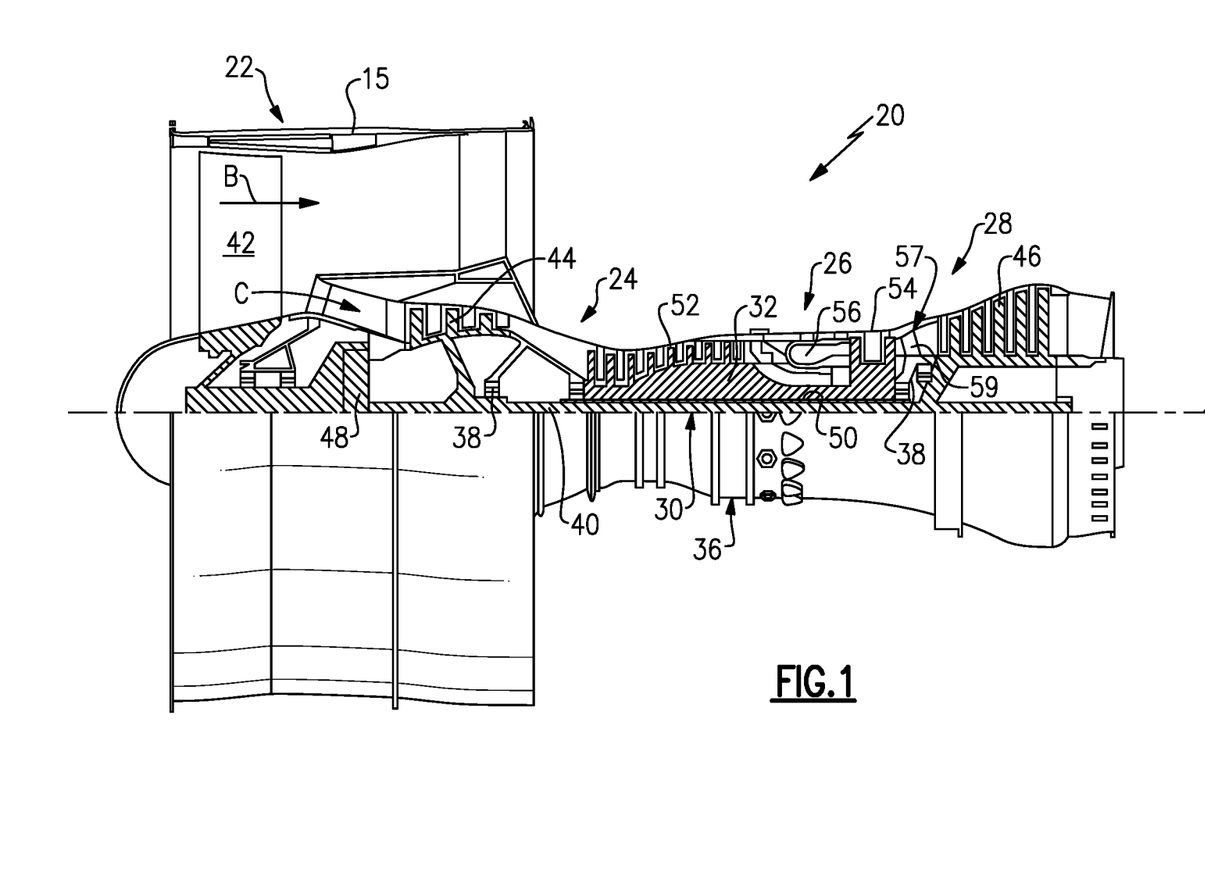
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a first (or low) pressure compressor 44 and a first (or low) pressure turbine 46. The inner shaft 40 is connected to a fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
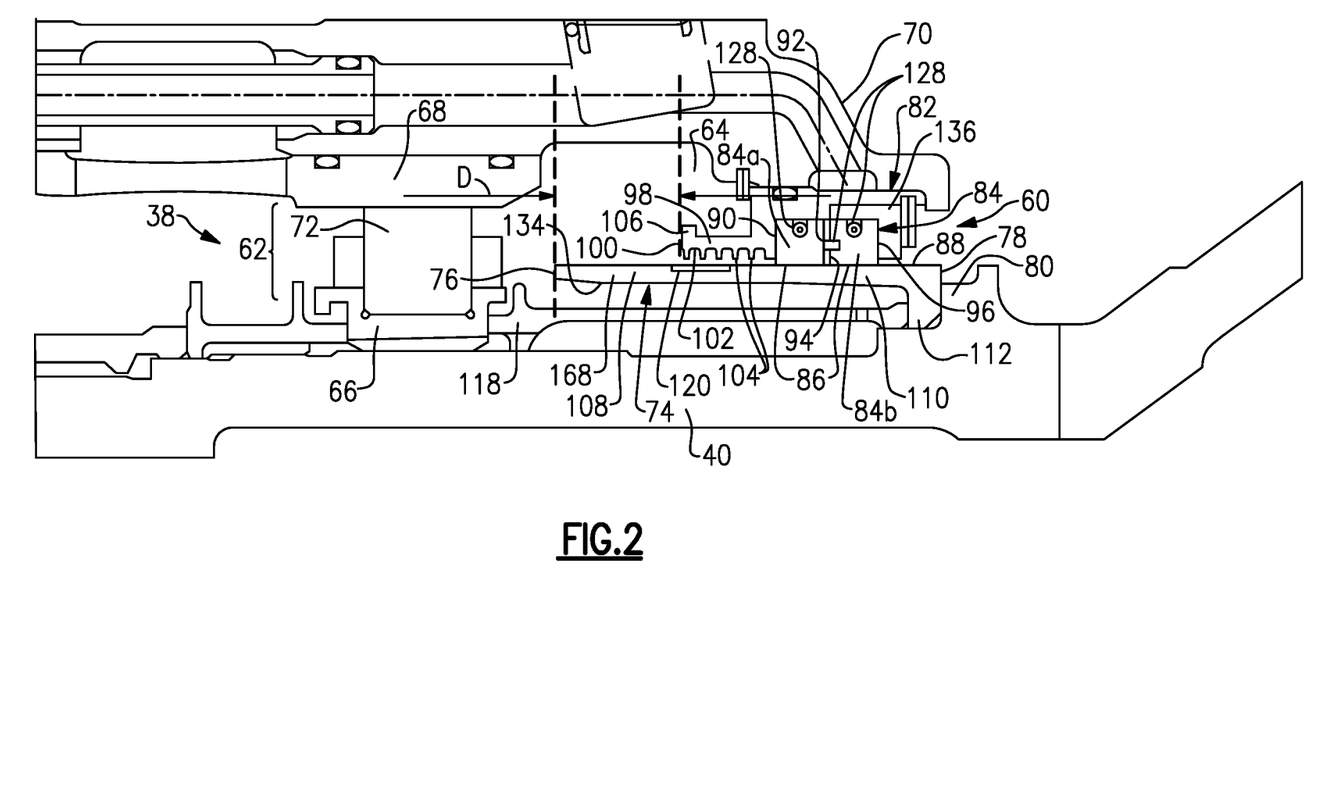
FIG. 2 is a side view of one example of a bearing and a seal assembly.

FIG. 2 shows an example of a bearing system 38 for the inner shaft 40 that includes a seal assembly 60. This is merely one example location for the seal assembly 60 and it should be understood that the seal assembly 60 could be used with any bearing system 38 within the gas turbine engine 20. The bearing system 38 includes at least one bearing 62 positioned within a bearing chamber or compartment 64. The bearing 62 includes an inner race 66 fixed to the shaft 40 and an outer race 68 fixed to an engine static structure 70. A bearing rolling element 72 is supported between the inner 66 and outer 68 races to support the shaft 40 for rotation relative to the engine static structure 70.

The seal assembly 60 provides sealing for the bearing compartment 64 and includes a seal runner 74 that rotates about the engine central longitudinal axis A. The seal runner 74 extends in an axial direction from a runner end face 76 that faces the bearing 62 to an opposite end face 78 that abuts directly against a shoulder 80 of the shaft 40. A seal housing 82 is fixed to the engine static structure 70 and includes an internal cavity that receives and encloses one or more seal rings 84 between the seal housing 82 and seal runner 74. Typically, the seal rings 84 comprise carbon/graphite seals. In one example, there is at least a first seal ring 84a and a second seal ring 84b. The first seal ring 84a and second seal ring 84b have a radially inner surface 86 that engages an outer radial surface 88 of the seal runner 74. The first seal ring 84a has a first end face 90 that faces the bearing 62 and a second end face 92 that abuts against an end face 94 of the second seal ring 84. The second seal ring 84 has an opposite end face 96 that abuts against the seal housing 82. Springs 128 are used to bias the seal rings 84a, 84b in a desired sealing direction as known.

The seal housing 82 includes a first housing portion 98 extending in an axial direction from the first end face 90 of the first seal ring 84a to a housing end face 100 that faces the bearing 62. The first housing portion 98 has an inner peripheral surface 102 that directly faces the rotating shaft 40. A plurality of discrete ribs or protrusions 104 extend radially inwardly from the inner peripheral surface 102 toward the shaft 40. The ribs or protrusions 104 extend circumferentially around the axis A and are axially spaced apart from each other in a direction along the axis A. The ribs or protrusions 104 form a continuous channel to windback any oil in the vicinity of the seal rings 84 thus improving oil containment of the sealing arrangement. In one example, the first housing portion 98 also includes a radial lip 106 that extends radially outwardly from a distal end of the first housing portion 98. The lip 106 forms part of the housing end face 100. The lip 106 helps to form a fluid collection cavity along an outer surface of the first housing portion 98.

The seal runner 74 has a first runner portion 108 that extends from the first end face 90 of the first seal ring 84a to the runner end face 76 and a second runner portion 110 that extends from the first end face 90 of the seal ring 84a to the opposite end face 78 that abuts directly against the shoulder 80 of the shaft 40. The second runner portion 110 has a distal end 112 that extends in a radially inward direction toward the shaft 40. The distal end 112 forms part of the end face 78. The first runner portion 108 is radially spaced apart from the shaft 40 and the distal end 112 engages the shaft 40. The second runner portion 110 also supports the first 84a and second 84b seal rings. A spacer 118 has one end directly against the inner race 66 of the bearing 62 and an opposite end directly engaging the distal end 112 to hold the seal runner 74 in place against the shaft 40. A second housing portion 136 extends from the first housing portion 98 to seat the seal rings 84a, 84b to the engine static structure 70 and enclose the rings 84a, 84b between the seal housing 82 and seal runner 74.

Figure 3:
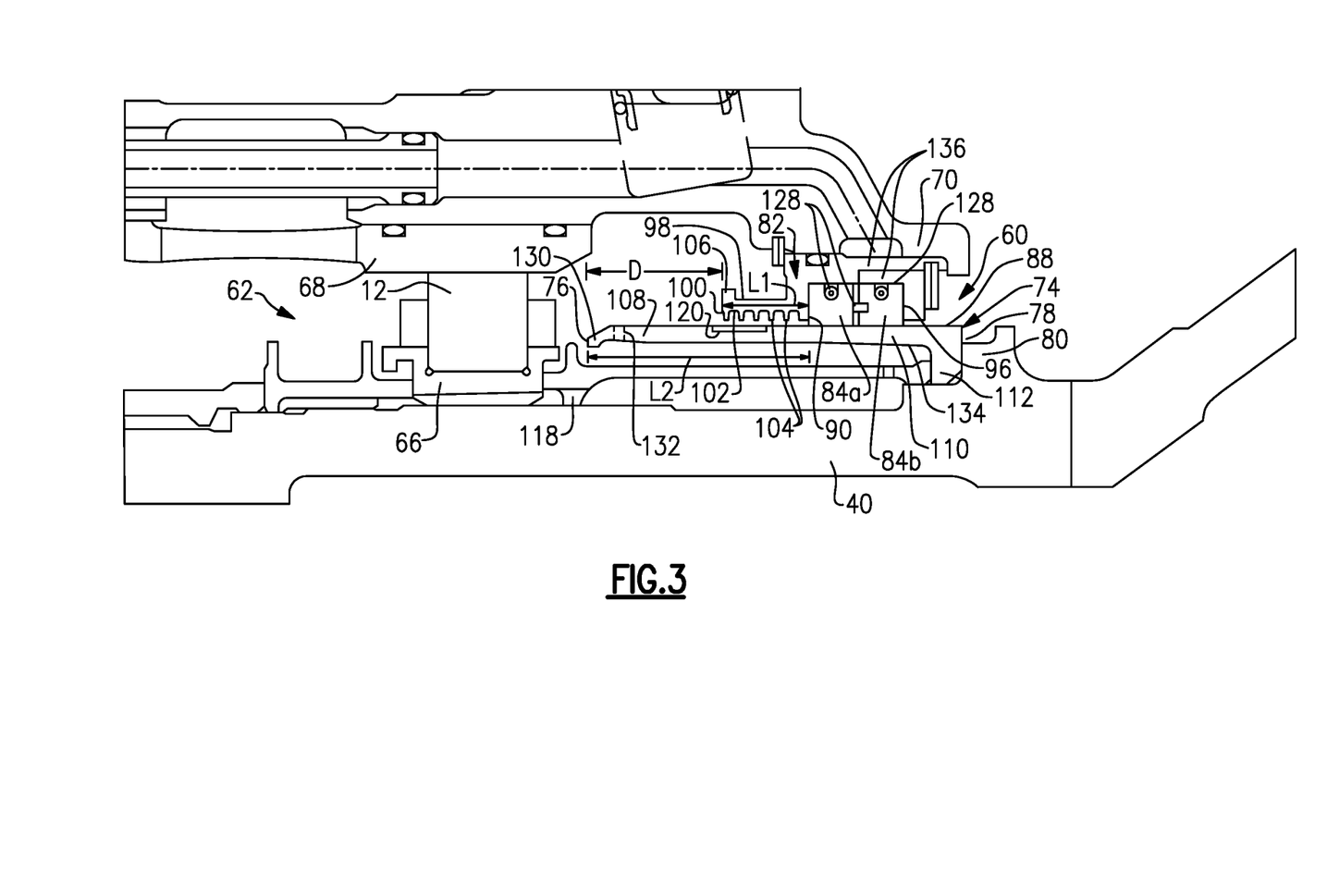
FIG. 3 is a side view of another example of a bearing and a seal assembly.

As best shown in FIG. 3, the first housing portion 98 has a first axial length L1 extending from the first end face 90 of the first seal ring 84a to the housing end face 100. The first runner portion 108 has a second axial length L2 that extends from the first end face 90 of the first seal ring 84a to the runner end face 76. The second axial length L2 is always greater than the first axial length L1. In one example, the second axial length L2 is at least 35% longer than the first axial length L1. In another example, the second axial length L2 is at least 50% longer than the first axial length L1.

Figure 5:
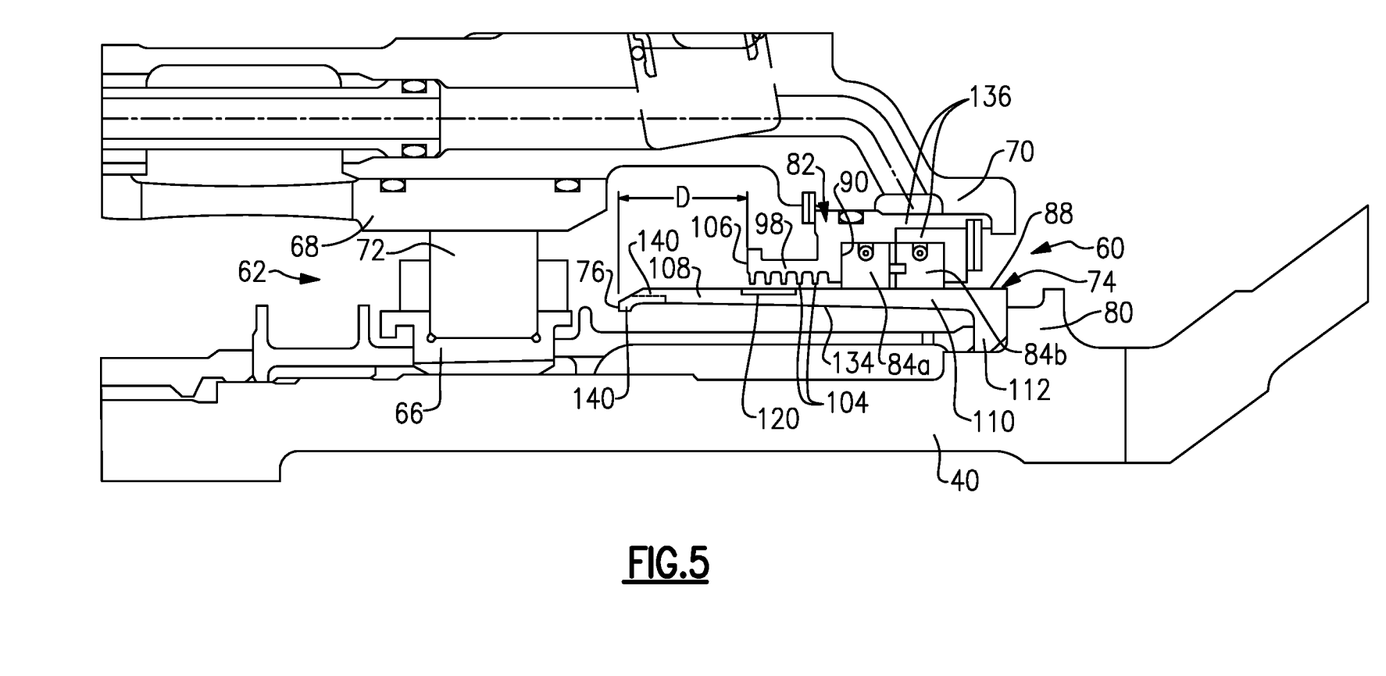
FIG. 5 is a side view of another example of a bearing and a seal assembly.

In the examples shown in FIGS. 2-3 and 5, the first axial length L1 can range from 0.30 inches (0.762 cm) to 0.60 inches (1.524 cm), for example, and the second axial length L2 can range from 1.0 inches (2.54 cm) to 1.50 inches (3.81 cm), for example. This results in a ratio of L2/L1 that is within a range of 1.67 to 5. This ratio is significantly higher than in prior seal configurations and provides for increased oil containment as compared to prior designs.

Figure 4:
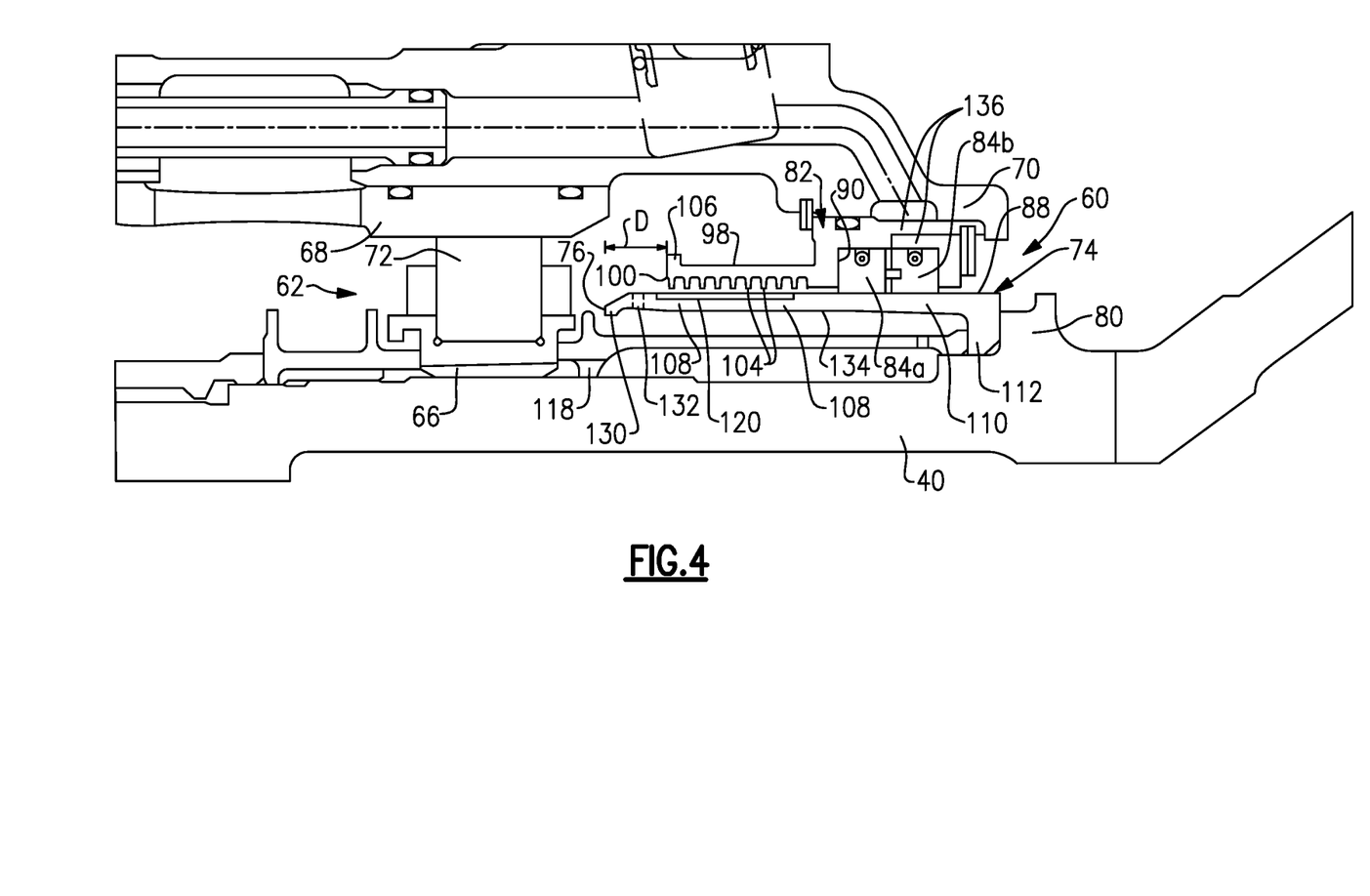
FIG. 4 is a side view of another example of a bearing and a seal assembly.

In the example shown in FIG. 4, there is an extended windback and the first axial length can range from 0.80 inches (2.032 cm) to 1.20 inches (3.048 cm), for example, and the second axial length L2 can range from 1.40 inches (3.556 cm) to 4.0 inches (10.16 cm), for example. This results in a ratio of L2/L1 of 1.17 to 5. Ratios within the range of greater than 1.6 up to 5 are preferred as this provides for increased oil containment as compared to prior designs.

As shown in FIGS. 2-3, a distance D is defined between the housing end face 100 and the runner end face 76. Traditionally, this distance D is small to maintain close axial proximity of runner cooling fluid to the static seal housing 82. However, advanced engine applications have a higher rubbing velocity which is a challenge to control and maintain acceptable levels of oil containment from the bearing compartment when using small radial clearance seals. In these advanced application, the small distance D can lead to higher levels of fluid exposure to the seal ring-to-runner sealing interface, which can result in increased bearing compartment fluid loss and reduced fluid containment.

The disclosed seal assembly 60 provides for a radial seal arrangement with an axially elongated fluid cooled runner 74. This runner 74 is significantly longer than traditional configurations such that the distance D is significantly increased to provide for improved fluid containment. As discussed above, in one example, the second axial length L2 is at least 35% longer than the first axial length L1 and in another example the second axial length is at least 50% longer. By axially elongating the runner 74, the exit point of the cooling fluid is further away from the static seal housing 82 and will decrease leakage. This improved configuration prevents the runner exit fluid from hitting the static seal housing directly within the inner diameter area, i.e. at the radially inner surfaces. The increased axial length further allows the static seal to utilize additional key features on the seal housing to capture any fluid that may try and drop down from compartment static surfaces onto the outer diameter of the runner, as well as, including optimized fluid loss mitigation components such as static windbacks, rotating runner chopper slots and rotating runner thumbnail slots or scallops. This will be discussed in greater detail below.

Figure 6:
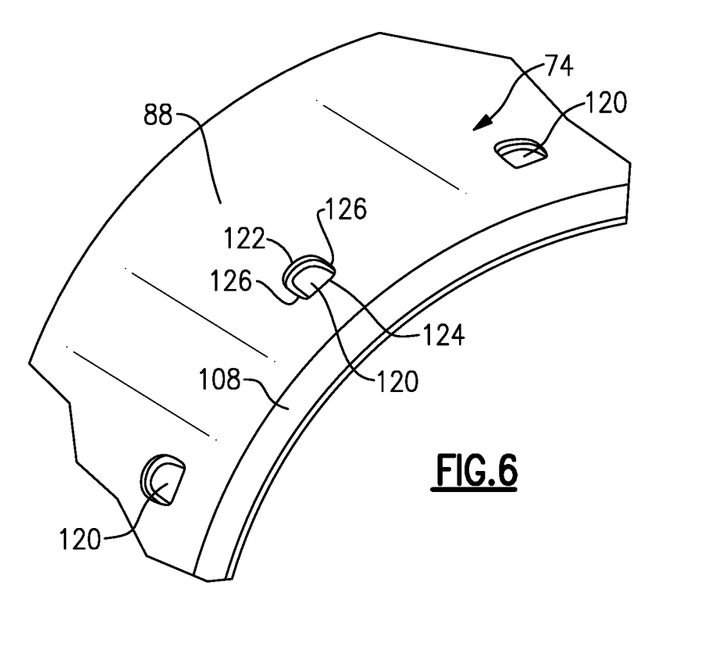
FIG. 6 shows an example of chopper slots formed in a seal runner of the seal assembly of any of FIGS. 2-5.

In one example shown in FIG. 2, the first runner portion 108 includes a radially outer surface 88 with a plurality of chopper slots 120 spaced circumferentially apart from each other as shown in FIG. 6. As shown in FIG. 6, the chopper slots 120 are formed within the radially outer surface 88 as recessed areas. The slots 120 do not extend through the thickness of the seal runner 74. In one example, each slot 120 has a curved portion 122 that faces a straight portion 124. Side walls 126 connect the curved portion 122 to the straight portion 124.

In one example shown in FIG. 2, the plurality of ribs or protrusions 104 of the first housing portion 98 directly face the plurality of chopper slots 120. Thus, the protrusions 104 are aligned with, or are overlapping with, the chopper slots 120 in a radial direction. This is also shown in FIGS. 3-5. As the chopper slots 120 are formed in the seal runner 74, the slots 120 rotate with the shaft 40. The rotating chopper slots 120 improve the efficiency of the windback of the first housing portion 98.

FIG. 3 shows an example where the first runner portion 108 includes a retention lip 130 that extends in a radially inward direction at the runner end face 76. The fluid that is radially between the seal runner 74 and the shaft 40 can be built up as a reservoir because the fluid will hit the lip 130 before exiting, which slows down the exiting process and increases containment. In one example, the first runner portion 108 includes a plurality of exit holes 132 that extend through the first runner portion 108 from a radially inner surface 134 to the radially outer surface 88. The plurality of exit holes 132 are axially spaced apart from the retention lip 130. In one example, the plurality of exit holes 132 comprises a single row of holes 132 that are circumferentially spaced apart from each other about the axis A. The exit holes 132 further facilitate control of exiting fluid from the reservoir between the runner 74 and the shaft 40.

FIG. 4 is similar to the embodiment of FIG. 3 but includes a longer first housing portion 98. The distance D becomes narrower; however, the first runner portion 108 is still at least 35% longer than the first housing portion 98 and the exit point for the fluid is pushed further away from the static seal rings and housing portion. In this example, the runner end face 76 extends axially between the inner 66 and outer 68 races of the bearing 62 such that the end of the first runner portion 108 is surrounded by at least one of the inner race 66 and outer race 68 in a radially overlapping relationship.

Figure 7:
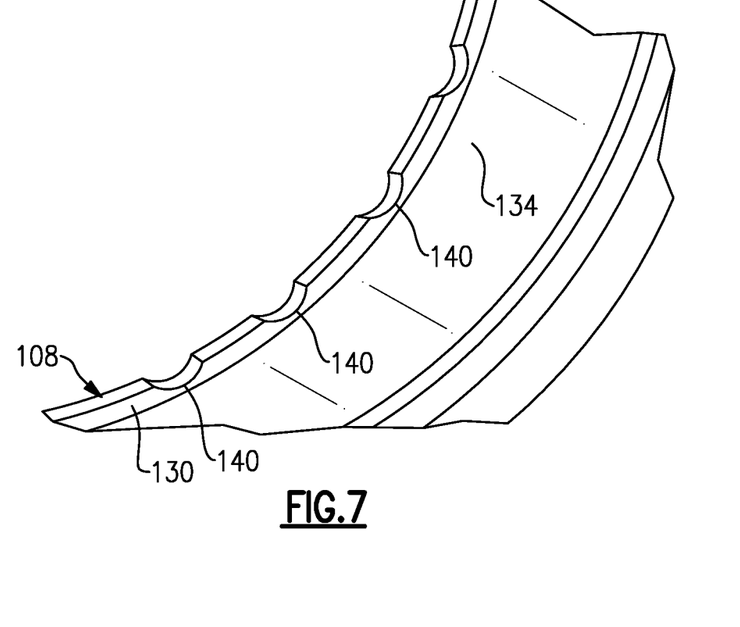
FIG. 7 shows an example of scallops formed in a seal runner of the seal assembly of any of FIGS. 2-5.

FIG. 5 is similar to the embodiment of FIG. 3 but in this example the retention lip 130 includes a plurality of scallops 140 formed within the radially inner surface 134 of the first runner portion 108. Examples of the scallops 140 are shown in FIG. 7. The scallops 140 cooperate with the retention lip 130 to break up the inner exiting fluid.

The subject seal runner 74 of the various disclosed embodiments provides for increased oil containment as compared to prior designs. This improves overall engine operating efficiency and the seal can be used in advanced engine applications with higher rubbing velocities without increasing leakage.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:
1. A gas turbine engine component comprising:
at least one bearing to support a shaft for rotation about an engine axis, wherein the at least one bearing is positioned within a bearing compartment; and
a seal assembly to provide sealing for the bearing compartment, wherein the seal assembly includes
a seal runner that rotates about the engine axis, and wherein the seal runner extends in an axial direction to a runner end face that faces the at least one bearing,
at least one seal ring fixed to an engine static structure and having a radially inner surface engaging the seal runner and a first end face that faces the at least one bearing,
a seal housing fixed to the engine static structure, and wherein the seal housing includes a first housing portion extending in an axial direction from the first end face of the at least one seal ring to a housing end face that faces the at least one bearing,
wherein the first housing portion has a first axial length extending from the first end face of the at least one seal ring to the housing end face, and wherein the seal runner has a first runner portion that has a second axial length that extends from the first end face of the at least one seal ring to the runner end face, and wherein the second axial length is at least 35% longer than the first axial length, and
wherein the first runner portion includes a radially outer surface with a plurality of chopper slots spaced circumferentially apart from each other, and wherein the plurality of chopper slots do not extend through a thickness of the first runner portion.

2. The gas turbine engine component according to claim 1, wherein the second axial length is at least 50% longer than the first axial length.

3. The gas turbine engine component according to claim 1, wherein the first housing portion includes a radially inner surface with a plurality of protrusions that face the plurality of chopper slots.

4. The gas turbine engine component according to claim 1, wherein the first runner portion includes a retention lip that extends in a radially inward direction at the runner end face.

5. The gas turbine engine component according to claim 4, wherein the first runner portion includes a plurality of exit holes extending through the first runner portion from a radially inner surface to the radially outer surface, and wherein the plurality of exit holes are axially spaced apart from the retention lip.

6. The gas turbine engine component according to claim 5, wherein the plurality of exit holes comprises a single row of holes that are circumferentially spaced apart from each other about the engine axis.

7. The gas turbine engine component according to claim 4, wherein the retention lip includes a plurality of scallops formed within a radially inner surface of the first runner portion.

8. The gas turbine engine component according to claim 1, wherein the at least one bearing includes an inner race fixed for rotation with the shaft and an outer race fixed to the engine static structure, and wherein the runner end face is surrounded by at least one of the inner race and outer race in a radially overlapping relationship.

9. The gas turbine engine component according to claim 1, wherein the at least one seal ring comprises at least two seal rings with a first seal ring that has the first end face that faces the at least one bearing and that has a second end face that faces a second seal ring, and wherein the seal housing includes a second housing portion that abuts against the second seal ring such that the first and second housing portions cooperate to enclose the first and second seal rings in a cavity formed between the seal housing and the seal runner.

10. The gas turbine engine component according to claim 1, wherein the plurality of chopper slots are axially spaced from the at least one seal ring in a direction along the engine axis.

11. The gas turbine engine component according to claim 9, wherein the seal runner includes a second runner portion that extends from the first end face of the first seal ring to a distal end that extends in a radially inward direction toward the shaft, and wherein the first runner portion is radially spaced apart from the shaft and the distal end engages the shaft.

12. A gas turbine engine component comprising:
at least one bearing to support a shaft for rotation about an engine axis, wherein the at least one bearing is positioned within a bearing compartment; and
a seal assembly to provide sealing for the bearing compartment, wherein the seal assembly includes
a seal runner that rotates about the engine axis, and wherein the seal runner extends in an axial direction to a runner end face that faces the at least one bearing,
at least one seal ring fixed to an engine static structure and having a radially inner surface engaging the seal runner and a first end face that faces the at least one bearing,
a seal housing fixed to the engine static structure, and wherein the seal housing includes a first housing portion extending in an axial direction from the first end face of the at least one seal ring to a housing end face that faces the at least one bearing, and wherein the seal housing includes a second housing portion that receives the at least one seal ring,
wherein the first housing portion has a first axial length extending from the first end face of the at least one seal ring to the housing end face, and wherein the seal runner has a first runner portion that has a second axial length that extends from the first end face of the at least one seal ring to the runner end face, and wherein the second axial length is longer than the first axial length,
wherein the first runner portion includes a retention lip that extends in a radially inward direction at the runner end face, and wherein the first runner portion includes a plurality of holes and/or a plurality of scallops, and
wherein the first runner portion includes a radially outer surface with a plurality of chopper slots spaced circumferentially apart from each other, and wherein the plurality of chopper slots do not extend through a thickness of the first runner portion.

13. The gas turbine engine component according to claim 12, wherein the plurality of holes comprises a plurality of exit holes extending through the first runner portion from a radially inner surface to the radially outer surface, and wherein the plurality of exit holes are axially spaced apart from the retention lip.

14. The gas turbine engine component according to claim 13, wherein the plurality of exit holes comprises a single row of holes that are circumferentially spaced apart from each other about the engine axis.

15. The gas turbine engine component according to claim 12, wherein the plurality of scallops formed within a radially inner surface of the first runner portion.

16. The gas turbine engine component according to claim 12, wherein the second axial length is at least 35% longer than the first axial length.

17. The gas turbine engine component according to claim 12, wherein the second axial length is at least 50% longer than the first axial length.

18. The gas turbine engine component according to claim 12, wherein the first housing portion includes a radially inner surface with a plurality of protrusions that face the plurality of chopper slots.

19. The gas turbine engine component according to claim 12, wherein the at least one seal ring comprises at least two seal rings with a first seal ring that has the first end face that faces the at least one bearing and that has a second end face that faces a second seal ring, and wherein the second housing portion abuts against the second seal ring such that the first and second housing portions cooperate to enclose the first and second seal rings in a cavity formed between the seal housing and the seal runner, and wherein the seal runner includes a second runner portion that extends from the first end face of the first seal ring to a distal end that extends in a radially inward direction toward the shaft, and wherein the first runner portion is radially spaced apart from the shaft and the distal end engages the shaft.

20. The gas turbine engine component according to claim 12, wherein the plurality of chopper slots are axially spaced from the at least one seal ring in a direction along the engine axis.

* * * * *